United States Patent Office 3,056,841
Patented Oct. 2, 1962

3,056,841
PROCESS FOR PREPARING MERCAPTO-TERMINATED THIOMETHYLENE COMPOUNDS
Klaus A. Saegebarth, Wilmington, Del., assignor to E. I. du Pont de Nemours and Company, Wilmington, Del., a corporation of Delaware
No Drawing. Filed Sept. 6, 1961, Ser. No. 136,207
7 Claims. (Cl. 260—609)

This invention relates to a novel process for preparing methane dithiol and low molecular weight mercapto-terminated polythiomethylenes and more particularly to a process for preparing these materials from hydrogen sulfide and formaldehyde.

Methane dithiol and mercapto-terminated polythiomethylenes are highly desirable materials. The polythiomethylene compounds made by the process of the present invention are useful at temperatures up to about 200° C. as lube oil additives in which they act both as antioxidants and as lubricity improvers.

The polythiomethylenes and methane dithiol have reactive —SH groups and are thus useful chemical intermediates. They can be reacted with NCO-terminated polymers or organic polyisocyanates to make polythiourethanes which exhibit excellent oxidative and thermal stability. The polythiourethane reaction products are useful for fabricating a wide variety of plastic and elastomeric articles. Furthermore, cellular products, suitable for making crash pads, topper pads, resilient cushions, rigid insulation panels, and the like, result when gas or a gas-forming agent is incorporated for expanding the reaction product prior to cure.

Although procedures for the preparation of methane dithiol and mercapto-terminated polythiomethylenes have been reported, the yields are not entirely satisfactory.

It is an object of the present invention to provide an improved process for preparing methane dithiol and low molecular weight mercapto-terminated polythiomethylenes. A further object is to provide a process for preparing these materials from readily available inexpensive starting materials. Other objects will appear hereinafter.

These and other objects of this invention are accomplished by providing a process for preparing methane dithiol and mercapto-terminated polythiomethylenes which comprises (a) reacting 1.75 to 10 mols of hydrogen sulfide as a liquid with about one mol of formaldehyde at superatmospheric pressure and at temperatures between about 40° C. and 150° C. so as to produce a normally liquid intermediate whose infrared absorption spectrum indicates the presence of mercapto and hydroxyl groups; (b) contacting said intermediate with an aqueous non-oxidizing mineral acid at a temperature of about 25° C. to 175° C., at least until the infrared absorption characteristic of the hydroxyl group disappears; and (c) recovering the bis-mercaptan thereby formed which has the structure

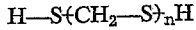

where $n$ is an integer of at least 1 indicating a number-average molecular weight up to about 160. If desired, the bis-mercaptan may be contacted with water at about 100° C. to increase the number-average molecular weight of the bis-mercaptan up to about 350.

The present process is carried out in several steps. In the first step, hydrogen sulfide is reacted with formaldehyde to obtain a normally liquid intermediate whose infrared spectrum contains bands at 3.95 and 3.0 microns characteristic of mercapto and hydroxyl groups, respectively. It is believed that at least part of the hydroxyl groups are present in molecules having the structure

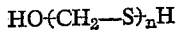

This reaction is to be carried out at temperatures ranging from about 40° to 150° C. and at superatmospheric pressure. If desired, the hydrogen sulfide may be initially reacted with the formaldehyde at temperatures lower than about 40° C.; however, it is necessary, in order to obtain the bis-mercapto compound, that the reaction be completed by heating to temperatures within the 40° to 150° C. range. The reaction time may range from about 1 to 6 hours. It has been found that the higher the reaction temperature and the longer the reaction time, the higher the molecular weight of the thiomethylene compound obtained. It is necessary that the reaction be carried out at superatmospheric pressure, usually autogenous pressure. It is essential that the pressure be sufficiently above atmospheric to liquefy the hydrogen sulfide.

The amount of hydrogen sulfide employed for reaction with the formaldehyde should range from about 1.75 to 10 moles per mole of formaldehyde. The formaldehyde may be used as an aqueous solution (such as a 37% aqueous solution stabilized with 12% methanol); however, quite satisfactory results are obtained when paraformaldehyde itself is used. The preferred ratio of reactants is about 1.75 to 2 moles of hydrogen sulfide per mole of formaldehyde. Other conditions being held constant, the molecular weight of the thiomethylene compound obtained tends to decrease as the value of the molar ratio of hydrogen sulfide to formaldehyde increases.

It is not necessary to isolate the normally liquid intermediate which is obtained as a result of the first step of the process. After it has been formed and the excess hydrogen sulfide has been removed by application of heat and vacuum, the intermediate is then contacted with an aqueous non-oxidizing mineral acid and thereby converted to the bis-mercaptan having the structure

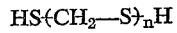

Suitable non-oxidizing acids include sulfuric, which is preferred, and hydrochloric acid. Representative and preferred concentrations are about 4 to 6 N.

This reaction with the acid can be carried out at any temperature ranging from about 25 to 175° C. At temperatures below 25° C. the reaction rate is too slow for the usual convenience. At temperatures above 175° C. there is an increased possibility of damaging the product as well as causing undesired polymerization to occur giving rise to crystalline high molecular weight products. In general, it is preferred to operate this step of the present process at about 100° C.

The pH of the medium in which the bis-mercapto compound is formed can influence the molecular weight. If the heating is carried out at a pH of 7 (neutral), the molecular weight of the bis-mercapto compound rises. For example, a fluid bis-mercapto compound having a molecular weight of 155 was changed by heating at 100° C. in water (pH of 7) to a benzene soluble higher analog having a molecular weight of 300 and melting at 50–55° C. Heating with water thus provides a way of obtaining tractable higher molecular weight polymers.

The concentration of the mineral acid in the aqueous phase can vary over a quite wide range without unduly affecting the molecular weight of the bis-mercaptan obtained. In a representative example of the preferred procedure, a hydroxy-mercapto-liquid intermediate having a molecular weight of 146 was prepared at 60° C. over a period of 4 hours; the pH of the aqueous solution at this point was 3.5–4. After the solution had been made 6 N in sulfuric acid and heated at 100° C. for six hours under a nitrogen atmosphere, a mercapto-terminated polythiomethylene was obtained having a molecular weight of 152. The polymer which was heavier than water and completely insoluble in water, was drawn off from the bottom of the reaction vessel.

After the liquid intermediate has been converted to the bis-mercaptan, it is merely necessary to recover this latter material from the reaction mixture by conventional means. If desired, the present invention may be operated on a continuous basis. Thus, formaldehyde, hydrogen sulfide and water may be continuously introduced into the upper portion of a well-agitated reaction zone. The hydroxy-mercapto liquid intermediate formed therein is then withdrawn from the base of this reaction zone and sent to a second reaction zone where hydrogen sulfide is continuously removed and recycled to the first reaction zone. The solution of the liquid intermediate is continually acidified by the addition of the non-oxidizing acid and the bis-mercaptan is continually withdrawn from the bottom of the reaction zone.

The following examples will better illustrate the nature of the present invention; however, the invention is not intended to be limited to these examples. Parts are by weight unless otherwise indicated.

EXAMPLE 1

A. *Preparation of a Liquid Intermediate*

A 1-liter stainless steel bomb was purged with nitrogen and charged with 284 grams (265 milliliters, 3.8 moles) of a 37% formalin solution (stabilized with 12% methanol). The bomb and contents were then cooled in a Dry Ice-acetone bath and the system evacuated. After hydrogen sulfide (225 grams, 6.75 moles) had been distilled into the bomb and liquefied therein, the bomb was sealed and heated at 60° C. for 4 hours. During this time the autogenous pressure was at least 25 atmospheres. The reaction vessel was then cooled to 0° C. and excess hydrogen sulfide was vented off to a caustic scrubbing tower. The 2-phase reaction mixture was poured into a separatory funnel. The lower layer which was collected, comprising the hydroxy mercapto liquid intermediate, weighed 210–230 grams (90–97% yield) and had a number-average molecular weight of 124–130. The procedure was repeated until a total of 1423 grams of product was made.

B. *Conversion to the Mercapto-Terminated Polythiomethylene Compound*

The intermediate prepared by the procedure of part A above (1423 grams) was heated, while rapidly stirred, at 100° C. for 6 hours in a reaction flask with concentrated hydrochloric acid (1000 milliliters) and boiled distilled water (2000 milliliters) under a nitrogen atmosphere. The resulting 2-phase reaction mixture was then cooled and filtered to remove some trithiane. The filtrate was transferred to a separatory funnel. The lower organic layer was separated, washed with two 500-milliliter portions of distilled water, and finally dried over anhydrous magnesium sulfate. The mercapto-terminated polythiomethylene compound obtained weighed 1090 grams (95% yield) and had a number-average molecular weight of 155.

C. When the procedure of part A above was repeated except that the reaction time was lengthened to 24 hours, a slightly lower yield (196 grams) of liquid intermediate resulted.

EXAMPLE 2

A nitrogen-purged 1-liter stainless steel shaker tube, charged with 37% formalin (284 grams, 265 milliliters, 3.8 moles formaldehyde) and hydrogen sulfide (225 grams, 6.75 moles) according to the procedure of Example 1, was agitated at 60° C. for a period of 4 hours. After the shaker tube had been cooled to 0° C. and unreacted hydrogen sulfide had been vented off, it was opened and the contents removed. The pH of the aqueous phase was 3.5–4.0. The organic phase (the liquid intermediate) weighed 220 grams. A 15-gram sample of the organic phase, dried over an anhydrous sodium sulfate, had a number-average molecular weight of about 152 and gave an infrared spectrum indicating the presence of HO—CH$_2$— groups.

The aqueous phase (240 milliliters) was made 6 N in acid with concentrated sulfuric acid (40 milliliters). It was then combined with the remaining organic phase and agitated at 100° C. for 6 hours under a nitrogen atmosphere. The lower organic layer (200 grams) was separated, washed with water until the washings were neutral, and dried over anhydrous sodium sulfate. The organic polymer had a number-average molecular weight of about 152; its infrared spectrum indicated the absence of HO—CH$_2$— groups.

EXAMPLE 3

Runs were made in which a 1-liter nitrogen-purged stainless steel bomb was charged according to the procedure of Example 1 with the following reactants:

| Run No. | Molar Ratio, Hydrogen sulfide:Formaldehyde | Formaldehyde [1] weight (moles) | Hydrogen Sulfide weight |
|---|---|---|---|
| A | 0.5:1 | 246 g. (3 mols) | 51 g. (1.5 mols). |
| B | 1:1 | 246 g. (3 mols) | 102 g. (3 mols). |
| C | 2:1 | 246 g. (3 mols) | 204 g. (6 mols). |
| D | 3:1 | 246 g. (3 mols) | 306 g. (9 mols). |
| E | 5:1 | 163 g. (2 mols) | 240 g. (10 mols). |
| F | 10:1 | 82 g. (1 mol) | 340 g. (10 mols). |
| G | 2:1 | 90 g. (3 mols) | 204 g. (6 mols). |

[1] 37% formalin solution (12% methanol stabilized) except for G where paraformaldehyde was used.

Each bomb was closed and rocked at 60° C. for 4 hours. The reaction mixtures were treated according to the procedure of Example 1A. The pH of the aqueous phases ranged between 3.4 and 4.2.

White, solid products containing both ether and thioether linkages were obtained from runs A and B. This result indicates that the desired liquid intermediates are not obtained when the hydrogen sulfide:formaldehyde molar ratio has a value of less than 1.75:1. Data for the remaining mixtures are shown in the table below.

| Run No. | Number-average molecular weight of liquid intermediate | Yield of product based on formaldehyde charged, percent |
|---|---|---|
| C | 122 | 98 |
| D | 108 | 99 |
| E | 100 | 99 |
| F | 95 | 97 |
| G | 124 | 74 |

EXAMPLE 4

A. Two 1-liter stainless steel bombs were charged according to the general procedure of Example 1 with 37% formalin (284 grams, 255 milliliters, 3.8 moles) and hydrogen sulfide (225 grams). Each bomb was then shaken for 4 hours at 60° C. The normally liquid intermediates were isolated by the procedure of Example 1A. The aqueous phases exhibited a pH of 3.5–4.0. The yield of intermediate in run A was 228.1 grams; run B gave 225 grams. 15-gram samples of the intermediates made in runs A and B were removed for analysis. The intermediates from runs A and B had number-average molecular weights of 122 and 124, respectively.

B. After concentrated hydrochloric acid (120 milliliters) had been added to the aqueous phase (220 milliliters) of run A to make it 6 normal in acid, it was combined with the organic phase and agitated at 100° C. for 6 hours under a nitrogen atmosphere. The layers were separated and the lower organic layer (205 grams) was washed with water until neutral and then dried over anhydrous sodium sulfate. A lesser amount of concentrated hydrochloric acid (20 milliliters) was added to the aqueous phase from run B to make it 0.1 normal in acid. The aqueous phase was then combined with the organic phase from run B and agitated at 100° C. for 6 hours under a nitrogen atmosphere. The organic phase, separated and purified by the procedure of A above, weighed 202.3 grams. The polymers from runs A and B, after the acid treatment, had number-average molecular weights of about 128 and 132, respectively.

EXAMPLE 5

*Increasing the Bis-Mercaptan Molecular Weight*

A 2-phase mixture of 155 grams of an HS-terminated polythiomethylene compound having a number-average molecular weight of 155 and 1000 grams of boiled distilled water was heated at reflux while rapidly stirred in a 3-liter flask. A nitrogen sweep, to expel the evolved hydrogen sulfide, was maintained throughout the reaction period. After the mixture had been heated under reflux for 8 hours, it was allowed to cool while stirred. The organic lower layer was separated, washed with water, and dried in a vacuum desiccator. The HS-terminated polythiomethylene compound thereby obtained weighed 143.2 grams and had a number-average molecular weight of 258 (boiling point elevation of acetone). Analysis: C, 22.9; H, 4.6; S, 68.4.

As many widely different embodiments of this invention may be made without departing from the spirit and scope thereof, it is to be understood that this invention is not limited to the specific embodiments thereof except as defined in the appended claims.

What is claimed is:

1. A process for preparing mercapto-terminated thiomethylene compounds selected from the group consisting of methane dithiol and mercapto-terminated polythiomethylenes which comprises (*a*) reacting 1.75 to 10 moles of hydrogen sulfide as a liquid with about one mol of formaldehyde at superatmospheric pressure and at temperatures between about 40° C. and 150° C. so as to produce a normally liquid intermediate whose infrared absorption spectrum indicates the presence of mercapto and hydroxyl groups; (*b*) contacting said intermediate with an aqueous non-oxidizing mineral acid at a temperature of about 25° C. to 175° C., at least until the infrared absorption characteristic of the hydroxyl group disappears; and (*c*) recovering the bis-mercaptan thereby formed which has the structure

$$H-S(CH_2-S)_nH$$

where $n$ is an integer of at least 1 indicating a number-average molecular weight up to about 160.

2. The process of claim 1 wherein the bis-mercaptan is contacted with water at about 100° C. whereby the number-average molecular weight is increased up to about 350.

3. The process of claim 1 wherein the non-oxidizing mineral acid is sulfuric acid.

4. The process of claim 1 wherein the non-oxidizing mineral acid is hydrochloric acid.

5. The process of claim 1 wherein the molar ratio of hydrogen sulfide to formaldehyde is about 2:1.

6. The process of claim 5 wherein the hydrogen sulfide is reacted with formaldehyde at a temperature of about 60° C.

7. The process of claim 6 wherein the intermediate is contacted with the aqueous non-oxidizing mineral acid at a temperature of about 100° C.

No references cited.